United States Patent Office 3,470,192
Patented Sept. 30, 1969

3,470,192
CERTAIN 2-(2,3-AND 4-PYRIDYL)-BENZOFURAN AND DERIVATIVES THEREOF
Fernand Binon and Herbert Ziegler, Brussels, and Henri Inion, Wemmel, Brabant, Belgium, assignors, by mesne assignments, to Laboratoires Labaz, Paris, France
No Drawing. Filed Nov. 12, 1965, Ser. No. 507,559
Claims priority, application Great Britain, Nov. 11, 1964, 46,043/64
Int. Cl. C07d 31/32; A61k 27/00
U.S. Cl. 260—297
10 Claims This invention relates to novel benzofuran derivatives, to methods for preparing the same and to their therapeutic use.

The benzofuran derivatives with which the invention is concerned are represented by the general formula:

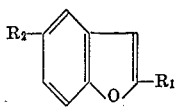

I wherein $R_1$ represents 2-pyridyl, 3-pyridyl, 4-pyridyl, 6-methyl-2-pyridyl, 5-methyl-2-pyridyl or 5-methyl-4-pyridyl, and $R_2$ represents hydrogen, chlorine, methyl or piperidino-methyl.

The pharmaceutically acceptable acid addition salts of the compounds of Formula I are included within the scope of the present invention.

It is an object of the invention to provide novel benzofuran derivatives which have pharmacological properties.

A feature of the invention is to employ such benzofuran derivatives for their tranquilizing effects to eliminate anxiety.

The compounds of the invention may be prepared by novel methods employing standard procedures. For example, the compounds of formula I may be prepared by heating an alkali-metal derivative, preferably the sodium derivative, of a compound of the general formula:

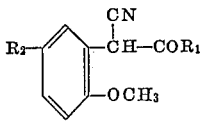

II wherein $R_1$ and $R_2$ have the same meanings as in Formula I, with concentrated hydrobromic acid to form the desired compound.

In the case of the compounds of Formula I in which $R_1$ represents a 2- or 4-pyridyl group with or without a methyl substituent, an alternative process for their preparation comprises reacting a compound of the general formula:

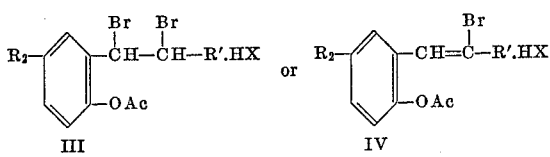

wherein R′ is a 2- or 4-pyridyl group with or without a methyl substituent, X is chlorine or bromine, Ac is acetyl and $R_2$ has the same meaning as in Formula I, with a strong alkaline agent such as an alkali-metal hydride or hydroxide, for example sodium hydride or potassium hydroxide, or an alkali-metal alkoxide, for example sodium or potassium ethoxide, isopropoxide or tert.butoxide, whereby the compound of Formula III or IV is cyclized to form the desired benzofuran derivative.

The intermediates of Formula II may be prepared in a manner illustrated schematically as follows:

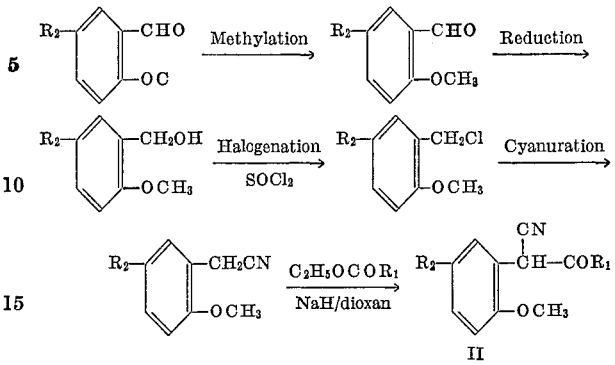

The intermediates of Formulae III and IV may be prepared in a manner illustrated schematically as follows:

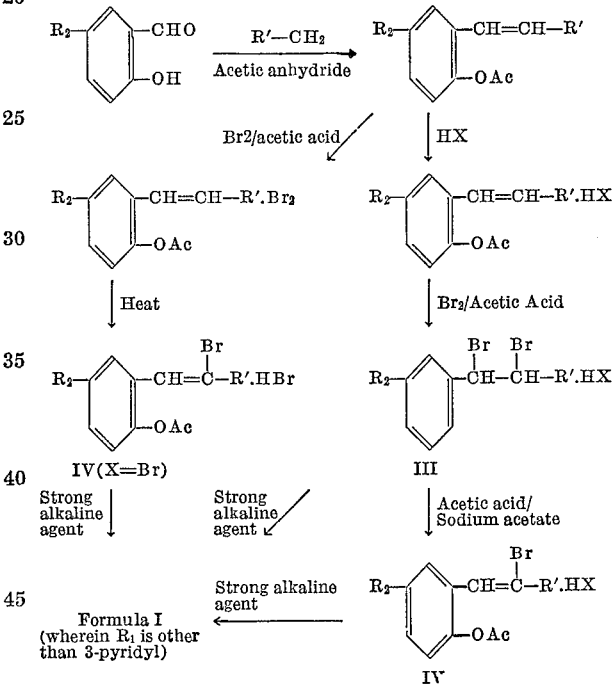

The strong alkaline agent referred to in the reaction scheme above may be, for example, an alkoxide such as sodium ethoxide, or potassium hydroxide or sodium hydride.

It is to be understood that the process of preparing the substances represented by Formulae II, III and IV does not form part of the invention as claimed.

The compounds of the invention have been found to possess pharmacological activity. In particular, some of the compounds falling within the definition of Formula I have been found to possess useful properties in reducing or eliminating anxiety in disorders of psychogenic origin. One such compound is 2-(4-pyridyl)-benzofuran.

The art of treating disorders of psychogenic origin by chemotherapy is still in its infancy. There already exist large numbers of agents which can be roughly divided into several categories, but in no case can the mechanism of operation of these agents be described with any degree of certainty. In the recent publication "Drugs of Choice 1964/1965" it is stated that: "The concept of bringing about a calm or more tranquil mental state without any considerable degree of sedation is of recent origin . . . there are now over forty drugs recommended and being used as tranquilizers. These agents are among the three or four most commonly prescribed drugs. There seems to be no decrease in their popularity and each new agent, if effective, is soon widely prescribed."

When discussing the more recent drugs employed in the control of anxiety conditions, "Drugs of Choice 1964/1965" declares, with regard to the very useful agent chlordiazepoxide: "At present, the drug is used for all manner of mental tension states, but as experience grows it is evident that it will not be beneficial at times, even though all indications seem to point out that it should. It, like meprobamate when it was first introduced, has not yet found its proper position in therapy."

The fact that the mode of action of anti-anxiety drugs is still a question of hypothesis renders it impossible for the physician to state in advance with any certainty whether the patient will react favorably or not.

It is certain that no single drug has yet been found which will produce a favorable response in all cases. Effective treatment must necessarily depend upon accurate diagnosis and the choice of the appropriate selective drug. This is one of the principal reasons for the large and increasing numbers of drugs available for the treatment of mental disorders characterized by anxiety states. The present situation is admirably expressed in the Summary of the article entitled "The Role and Importance of the New Psychotropic Medicaments in the Treatment of Psychoneurosis" published in "La Presse Medicale" of 17th February 1962, pp. 377–379 which reads in part as follows: "The new psychotropic medicaments have considerably enriched our therapeutic arsenal. They do not exert a curative but merely a symptomatic effect. Their action is inconsistent, varying from one subject to another and is devoid of any precise correlation between dosage and clinical effect. They are polyvalent as regards activity and at certain doses produce undesirable side effects. Their role is limited to that of an aid for use in conjunction with more profound treatment."

It is not claimed that the compounds of the invention constitute an overall solution to the entire problem of anxiety states, but it is considered that, when used selectively, in accordance with present medical practice, they can offer certain advantages in the treatment of psychogenic disorders in which anxiety predominates. This is particularly true of 2-(4-pyridyl)-benzofuran.

Pharmacological trials with hte compounds of the invention, and more especially with 2-(4-pyridyl)-benzofuran, have shown that the compounds exert a depressant effect without the initial period of excitement characteristic of most of the depressive drugs. It has been found that the compounds of the invention, and notably 2-(4-pyridyl)-benzofuran, suppress the effects of excitant drugs such as amphetamine and morphine, as well as the excitant action of the anti-depressants. Furthermore, the compounds of the invention have been found to potentialize the cortico-hypnotic action of the barbiturates. Pharmacological investigations have also revealed that the compounds of the invention do not possess hypnotic, anti-convulsive or myorelaxant properties.

In clinical practice, 2-(4-pyridyl)-benzofuran was tried in a wide variety of cases of mental disorders, from which it became evident that the principal activity of the compound lay in the field of anxiety sedation.

For example, of eighty patients who reacted favorably to therapy administered, in tablet form, by various clinicians under differing circumstances and comprising an average daily dose of 200 mg. of 2-(4-pyridyl)-benzofuran per day over an average period of twelve days, it was observed that the symptoms which responded most readily to the therapy thus applied were those essentially characteristic of states of anxiety and of anxiety neurosis. Amongst the cases so treated, 20% gave excellent results and 80% good results. No undesirable side-effects were observed at any time.

It has further been observed that the compound in question does not potentialize the action of the neuroleptics and that, although it cannot be classified as a hypnotic in the true sense of the term, it tends to facilitate natural sleep through the medium of its anti-anxiety properties.

The results of investigation suggest that the activity of the compound of the invention would appear to be exerted between the thalamus and the cerebral cortex, in that the impulses transmitted from the thalamus to the cerebral cortex are slowed down with the result that the cerebral response to the external stimuli is attenuated with consequent diminution of excitability, hyperemotivity and anxiety.

It will be appreciated that for therapeutic use the compounds of the invention will normally be administered in the form of a pharmaceutical composition comprising an essential active ingredient a compound of Formula I, or a pharmaceutically acceptable acid addition salt thereof, in association with a pharmaceutical carrier therefor.

The carrier may be a solid or liquid diluent or excipient of the kind normally employed in the production of medicaments ready for use, for example, lactose, potato starch, talc, magnesium stearate, gelatin, sodium chloride or distilled water.

The composition may be made up in a form suitable for the desired mode of administration, which may be by the oral or parenteral route. Advantageously for clinical use the composition is made up in a dosage unit form adapted for the desired mode of administration. The dosage unit may be, for example, a tablet, pill, package powder or capsule for oral administration, or a sterile solution packaged in a sealed container, such as an ampoule for parenteral administration. The amount of active ingredient in each dosage unit will be such that one or more units are required for each therapeutic administration. For example, the dosage unit may contain from 5 to 250 mg. of the active ingredient.

In view of the aforementioned pharmacological activity of the compounds of Formula I, it will be appreciated that the invention provides a method of reducing or eliminating anxiety, which comprises administering in a sufficient non-toxic dose a compound of Formula I, or a pharmaceutically acceptable acid addition salt thereof, preferably in the form of a pharmaceutical composition as hereinbefore described.

The following examples illustrate the invention:

EXAMPLE 1

Salicylaldehyde was methylated in accordance with the method described by J. Levine et al. in J. Am. Chem. Soc., 70, 48 (1930) in order to obtain 2-methoxybenzaldehyde in the following manner. 488 g. of salicylaldehyde (4 mol) were placed in a 3-liter reaction vessel equipped with five ground-glass necks, a double-action ascending condenser, a thermometer, a mechanical stirrer and two funnels. The salicylaldehyde was heated, while being stirred, to 100° C., whereupon part of a solution prepared from 240 g. of NaOH (6 mol and 600 ml. of water was added until a precipitate appeared which was the sodium salt of the salicylaldehyde. At this point, the remainder of the NaOH solution was added to the reaction mixture simultaneously with 630 g. of dimethyl sulphate (5 mol). The reaction was markedly exothermic and vigorous reflux occurred. When the NaOH solution and the dimethyl sulphate had been completely added, the reaction mixture was heated for one hour at 100° C. and then cooled, after which the resulting 2-methoxybenzaldehyde was extracted with 4×300 ml. of ether, the organic solution washed with water and then dried over anhydrous sodium sulphate. After filtration, the solvent was distilled off, the oily residue distilled under vacuum, providing 460.4 g. of 2-methoxybenzaldehyde, B.P. 105–110° C./15 mm. Hg.

This compound was reduced by the method described by Z. Honi et al. (Chem. Abs., 51, 8671c) to form o-methoxybenzyl alcohol in the following manner: 426 g.

of the 2-methoxybenzaldehyde (3.13 mol), 630 ml. of methanol and 309 g. of a 40% solution of formol were placed in a 3 liter reaction vessel equipped with an ascending condenser, a thermometer, a mechanical stirrer and a funnel. The mixture was heated, while being stirred, to 60° C., after which 376 g. of a 50% aqueous solution of NaOH were added drop-by-drop. The reaction was exothermic and the NaOH solution was introduced in such a way as to maintain a temperature of 60 to 65° C. The operation of adding the NaOH solution lasted about 45 minutes. The solution was then heated for three hours at 70° C. The major part of the methanol was distilled off by means of a water-bath, and the residue diluted with water and extracted with benzene. Whenever an emulsion formed, a saturated solution of NaCl was added. The organic solution was dried over anhydrous sodium sulphate and filtered. The benzene was distilled off under reduced pressure and the oily residue distilled under vacuum, providing 354 g. of o-methoxybenzyl alcohol, B.P. 122–123° C./15 mm. Hg. To convert this intermediate alcohol to o-methoxybenzyl chloride, 230 g. of the o-methoxybenzyl alcohol (2.31 mol) and 1,600 ml. of anhydrous benzene were placed in a reaction vessel equipped with an ascending condenser, a thermometer, a mechanical stirrer and a funnel. The solution was cooled to about 0° C. by means of an ice-bath, after which 360 g. of thionyl chloride (3 mol) were added over a period of three hours while stirring. The internal temperature was maintained at between 0° C. and 5° C. The solution was then allowed to stand for about 15 hours, after which it was heated for two hours at 50° C. It was then washed with 3×800 ml. of water, 3×600 ml. of a 10% aqueous solution of NaHCO$_3$ and 3×800 ml. of water. The organic fraction was dried over anhydrous sodium sulphate and filtered. The benzene was distilled off under reduced pressure to provide an oily residue which was distilled under vacuum to give 273.3 g. of o-methoxybenzyl chloride, B.P. 100–102° C./15 mm. Hg.

This chloride was then converted to 2-methoxyphenyl acetonitrile by the method described by R. Pschorr et al. (Berichte, 33, 166, 1900) in the following manner: 258 g. of finely crushed sodium cyanide and 2,500 ml. of dimethylformamide were placed in a 6 liter flask, equipped with an ascending condenser, a thermometer, a mechanical stirrer and a funnel. To the mixture so formed was added, while stirring vigorously and over a period of 30 minutes, a solution of 270 g. of the o-methoxybenzyl chloride in 760 ml. of dimethylformamide. The solution was heated to 50° C. in about one hour and maintained, while being stirred, at this temperature for about 4 hours. Under reduced pressure, and still stirring, 3 liters of dimethylformamide were distilled off. The residue was poured into 3.5 liters of iced water. The nitrile which precipitated was filtered, washed with water, centrifuged and dried under vacuum over P$_2$O$_5$ giving 232 g. of 2-methoxyphenylacetonitrile, M.P. 70–71° C. To convert the nitrile to the sodium derivative of α-cyano-o-methoxybenzyl-4-pyridyl ketone, the method described by Schutz et al. in Helvetica Chim. Acta, 78, 620–626, 1953 was employed. 390 ml. of dioxan and 45 g. of 50% sodium hydride (0.94 mol) were placed in a 2-liter three-necked flask, equipped with a thermometer, a mechanical stirrer, a funnel and an ascending condenser fitted with a CaCl$_2$ tube. The reaction medium was heated to 80° C. while being stirred, after which the source of heat was cut off, and a mixture of 111 g. of the 2-methoxyphenylacetonitrile (0.75 mol) and 163 g. of the ethyl ester of pyridine-4-carboxylic acid (1.08 mol) was added drop-by-drop over a period of 90 minutes. The reaction was exothermic, the temperature rose to 95° C., and the solution which foamed was then maintained at 80° C. for 3 hours, after which it was allowed to cool and 1,200 ml. of petroleum ether (B.P. 40/60° C.) were added. The resulting mixture was filtered over fritted glass and the residue was washed with about 500 ml. of petroleum ether, thoroughly centrifuged and dried in a desiccator under vacuum over P$_2$O$_5$ to provide 262 g. of the sodium derivative of α-cyano-o-methoxybenzyl-4-pyridyl ketone.

The 262 g. of the sodium derivative of α-cyano-o-methoxy-benzyl-4-pyridyl ketone so obtained, together with 2 liters of a 48% solution of hydrobromic acid were placed in a 5 liter flask fitted with a ground-glass neck and a reflux condenser. The solution was heated under reflux for 20 hours. The resulting solution was stirred with activated charcoal and filtered and the resulting filtrate was concentrated. 80% of hydrobromic acid was recovered. The residue was taken up in water, treated while hot with activated charcoal and filtered over a Seitz K$_2$ plate. The filtrate was cooled and made alkaline with 10 N caustic soda in an ice bath. The resulting crude base was filtered, washed with water and dried in a desiccator under vacuum over P$_2$O$_5$. In this manner, 55.5 g. of crude 2-(4-pyridyl)-benzofuran were obtained, which were then dissolved in 2 liters of petroleum ether (B.P. 60–80° C.), treated with activated charcoal and filtered. Approximately half of the petroleum ether was distilled off and the residue allowed to crystallize at room temperature. The resulting crystals were filtered, washed over a filter with a small quantity of petroleum ether and dried under vacuum. In this manner, 48.5 g. of 2-(4-pyridyl)-benzofuran were obtained, M.P. 133–134° C., representing a yield of 33.1%.

By using the procedure described above with the appropriate starting material, the following compounds can be prepared:

(a) 2-(2-pyridyl)-benzofuran, M.P. 84° C., (ethanol/water)

(b) 2-(3-pyridyl)-benzofuran, M.P. 80° C. (ethanol/water)

formed respectively from the sodium derivative of α-cyano-o-methoxybenzyl-2-(or -3-) pyridyl ketone obtained by condensing the ethyl ester of either pyridine-2-carboxylic acid or pyridine-3-carboxylic acid with 2-methoxyphenyl-acetonitrile.

(c) 2-(3-pyridyl)-5-chloro-benzofuran, M.P. 110° C., (ethanol/water), (hydrochloride: M.P. 191° C.)

(d) 2-(4-pyridyl)-5-chloro-benzofuran, M.P. 154° C., (ethanol/water)

formed respectively from the sodium derivative of α-cyano-2-methoxy-5-chloro-benzyl-3-(or -4-) pyridyl ketone obtained by condensing the ethyl ester of either pyridine-3-carboxylic acid or pyridine-4-carboxylic acid with 2-methoxy-5-chlorophenyl acetonitrile (M.P. 60–61° C.) prepared from 2-methoxy-5-chloro-benzaldehyde (M.P. 80–81° C.) through 2-methoxy-5-chloro-phenyl-carbinol (B.P. 104–105° C./0.06 mm. Hg; M.P. 58° C.) and 2-methoxy-5-chloro-benzyl chloride (B.P. 137–139° C./15 mm. Hg; M.P. 52° C.)

(e) 2-(4-pyridyl)-5-methyl-benzofuran, M.P. 165° C., (ethanol)

formed from the sodium derivative of α-cyano-2-methoxy-5-methyl-benzyl-4-pyridyl ketone obtained by condensing the ethyl ester of pyridine-4-carboxylic acid with 2-methoxy-5-methyl phenyl acetonitrile (B.P. 151° C./14 mm. Hg) prepared from 2-methoxy-5-methyl benzaldehyde (B.P. 130.2° C./12 mm. Hg) through 2-methoxy-5-methyl-phenyl carbinol (B.P. 140–141° C./16 mm. Hg) and 2-methoxy-5-methyl-benzyl chloride (B.P. 94–95° C./11 mm. Hg).

EXAMPLE 2

Salicylaldehyde was condensed with γ-picoline in the presence of acetic anhydride in accordance with the method described by L. Horwitz in the J. Org. Chem., 21, 1,039–1,041 (1956) to obtain 1-(2-acetoxy-phenyl)-2-(4-pyridyl)-ethylene in the following manner. 46.5 g. of 4-methyl-pyridine (0.5 mol), 61 g. of salicylaldehyde (0.5 mol) and 102 g. of acetic anhydride (1 mol) were placed in a 1-liter flask fitted with a ground-glass neck and an ascending condenser. The solution was brought to the boiling point and so maintained for 6 hours. After partial cooling, the major part of the acetic anhydride, of the unconverted picoline and of the acetic acid formed was eliminated under reduced pressure. The oily residue, which was still warm, was vigorously stirred with 1,000 ml. of water. After complete crystallization, the suspension was neutralized with a saturated aqueous solution of $NaHCO_3$. The resultant product was filtered, washed with water and dried, providing 105.5 g. of 1-(2-acetoxy-phenyl)-2-(4-pyridyl)-ethyl, M.P. 120° C. The product so obtained was then converted to its hydrochloride salt in the following manner: 633 g. of 1-2(2-acetoxy-phenyl)-2-(4-pyridyl)-ethylene were dissolved in 2500 ml. of tetrahydrofuran in a 5-liter reaction vessel, equipped with a tube for introducing gaseous HCl and a mechanical stirrer. Gaseous HCl was bubbled through the solution, while stirring, until a filtered sample no longer gave a precipitate under the influence of gaseous HCl or until the test with Blue Oracet paper showed a positive reaction, thus providing the required hydrochloride which was filtered, washed with 500 ml. of tetrahydrofuran, centrifuged and dried under vacuum at 40° C. giving 604 g. of 1-(2-acetoxy-phenyl)-2-(4-pyridyl)-ethylene hydrochloride, decomposing at 200–220° C. The hydrochloride so obtained was converted by the action of bromine in acetic acid, in accordance with the method described by H. Baurath in Berichte, 21, 818 (1888), F. Butter in Berichte, 23, 2,696 (1890) and J. M. Smith et al. in the J. Am Chem. Soc., 70, 3,997 (1948), to 1-(2-acetoxy-phenyl)-1:2-dibromo-2-(4-pyridyl)-ethane hydrochloride in the following manner. 553 g. of 1-(2-acetoxy-phenyl)-2-(4-pyridyl)-ethylene hydrochloride (2 mol) were dissolved in 4,000 ml. of glacial acetic acid in a 10-liter reaction vessel, equipped with a powerful mechanical stirrer, an ascending double-action condenser, a thermometer and a funnel. To the solution so formed was added, while stirring, a solution composed of 307 g. of bromine (1.92 mol) in 500 ml. of glacial acetic acid at a speed such that the excess of bromine in the reaction medium remained slight. When the addition of the bromine was terminated, the reaction mixture was slowly heated to 65–70° C. to insure the dissolution of the perbromide and its conversion to the dibrominated derivative. The temperature was maintained for at least 15 minutes, after which it was reduced to 50° C. The maximum amount of acetic acid was distilled off under reduced pressure while stirring. To the distillation residue were added 750 ml. of isopropanol and the resultant solution was allowed to stand for about 15 hours, after which it was filtered, centrifuged, washed three times with 100 ml. of isopropanol and dried at 40° C. under vacuum. The total yield of 1-(2-acetoxy-phenyl)-1:2-dibromo-2-(4-pyridyl)-ethane hydrochloride obtained was between 610 g. and 740 g. decomposing at about 200° C.

In a 3-liter three-necked reactor equipped with a reflux condenser and mechanical stirrer, were placed 148 g. of potassium hydroxide (85%; 2.25 mol) and 500 ml. of isopropanol. The mixture was heated, while being stirred, until most of the potassium hydroxide was dissolved. After partial cooling, 218 g. of 1-(2-acetoxy-phenyl)-1:2-dibromo-2-(4-pyridyl)-ethane hydrochloride (0.5 mol) were added gradually while still stirring. The temperature rose to the boiling point of the alcohol. The reflux condenser was replaced by a normal condenser and the solution heated to obtain slow distillation of the alcohol. After 90 minutes, heating was reduced and the remainder of the isopropanol distilled under reduced pressure by maintaining the heat at the degree necessary to facilitate evaporation. The residue was taken up in 3 liters of water, whereupon 2-(4-pyridyl)-benzofuran crystallized out. At the same time oily impurities separated out. The crystals were filtered, centrifuged, washed with water over a filter and dried under vacuum at 50° C. Gross weight obtained: 63.9 g. The crude product was extracted with 1 liter of boiling petroleum ether (B.P. 60–80° C.). The product crystallized on cooling. The crystals were filtered, washed over a filter with petroleum ether (B.P. 60–80° C.) and dried under vacuum. A first fraction of crude product was obtained in an amount of 21.5 g., M.P. 133° C. When the filtrate was concentrated, a second fraction was obtained weighing 5.2 g., M.P. 144° C. The two fractions were dissolved in 800 ml. of boiling petroleum ether (B.P. 60–80° C.) in the presence of activated charcoal, filtered over a folded filter and the filtrate allowed to cool gradually. After complete crystallization, the filtrate was washed over a filter with petroleum ether and dried under vacuum at 40–50° C. In this way, a purified fraction of 17.8 g. was obtained having an M.P. of 134° C. By concentrating the filtrate, a further 3.3 g. of product were obtained, melting at 133° C. Total yield of 2-(4-pyridyl)-benzofuran was 21.1 g.

In place of the potassium hydroxide in isopropanol, there may be employed in the foregoing example, sodium ethoxide in ethyl alcohol, sodium isopropoxide in isopropyl alcohol, sodium tert. butoxide in tert.butyl alcohol, potassium hydroxide in ethyl alcohol, potassium hydroxide in water, sodium ethoxide in ethyl carbonate or sodium hydride in dioxan.

By using the procedure described in the foregoing example, with sodium ethoxide in ethyl alcohol as the alkaline cyclicizing agent, further compounds can be prepared in the following manner.

41.5 g. of sodium were dissolved in 600 ml. of absolute alcohol, in a 2-liter, three-necked flask, fitted with a mechanical stirrer and an ascending condenser.

To the hot solution of ethylate obtained, were added, in small portions and while stirring vigorously, 75 g. of one or other of the dibrominated derivatives corresponding to Formula III in which $R_2$ represents H and R' represents (6-methyl-2-pyridyl), (5-methyl-2-pyridyl) or (5-methyl-4-pyridyl), or in which $R_2$ represents piperidinomethyl and R' is (4-pyridyl). There occurred marked exothermicity and the ethanol was refluxed. The solution was heated to boiling point and so maintained for three hours. After cooling, about three liters of water were added. The 2-benzofuryl pyridine derivative obtained crystallized at the same time as a brown oily precipitate formed. The solution was filtered over G3 frittered glass, thoroughly centrifuged to eliminate as much oil as possible, washed with water and dried under vacuum.

The crude product thus obtained was recrystallized in petroleum ether (B.P. 60–80° C.) in heptane, ethanol or a mixture of ethanol and water, thus providing respectively according to the starting substance employed:

(i) 2-(6-methyl-2-pyridyl)-benzofuran (of which the hydrochloride decomposes at about 135° C.), obtained from 1-(2-acetoxyphenyl)-2-(6 - methyl-2-pyridyl)-ethylene hydrochloride (M.P. 165° C. with decomp.) through the hydrochloride of the corresponding dibrominated derivative.

(ii) 2-(5-methyl-2-pyridyl)-benzofuran (M.P. 112° C.) obtained from 1-(2-acetoxy-phenyl)-2-(5 - methyl-2-pyridyl)-ethylene hydrochloride (M.P. 170° C. with decomp.) through the hydrochloride of the corresponding dibrominated derivative.

(iii) 2-(5-methyl-4-pyridyl)-benzofuran (M.P. 72° C.) obtained from 1-(2-acetoxy-phenyl)-2-(5 - methyl-4-pyridyl)-ethylene hydrochloride (decomposes at about 210° C.) through the hydrochloride of the corresponding dibrominated derivative.

(iv) 2-(4-pyridyl) - 5 - (piperidinomethyl)-benzofuran (M.P. of the dioxalate: 203° C.) obtained from 1-(2-acetoxy-5-piperidinomethyl - phenyl)-2-(4-pyridyl)-ethylene dihydrochloride through the hydrochloride of the corresponding dibrominated derivative.

EXAMPLE 3

In a one liter three-necked flask, fitted with a reflux condenser, a mechanical stirred and a thermometer, was placed a solution consisting of 43.5 g. (0.1 mol) of 1-(2-acetoxy-phenyl)-1:2 dibromo - 2 - (4-pyridyl)-ethane hydrochloride (prepared in the manner described in Example 2) and 25 g. (0.3 mol) of anhydrous sodium acetate in 200 ml. of glacial acetic acid. This solution was heated under reflux for one hour, after which it was concentrated under reduced pressure, which enabled 160 ml. of acetic acid to be recovered (i.e. 80% of the quantity initially employed). The residue was taken up in water, carefully neutralized when cold with an aqueous solution of NaOH, extracted with ether and the ethereal extract washed with water. After the extract had been dried over $Na_2SO_4$ and treated with activated charcoal, an ethereal solution of hydrochloric acid was added. The precipitate so formed was filtered, washed with ether and dried under vacuum at 40° C. In this manner, 13.7 g. of 1-(2-acetoxy-phenyl)-2-bromo-2-(4-pyridyl)-ethylene hydrochloride were obtained, representing a yield of 78%. This hydrochloride was recrystallized from a mixture of absolute ethanol and ether to yield 8.6 g. of pure product (49% yield), M.P. 204° C. (decomp.).

In a 100 ml. three-necked flask fitted with a reflux condenser and a mechanical stirrer, were placed 4.2 g. of potassium hydroxide (85%; 0.6 mol) and 25 ml. of isopropyl alcohol. The mixture was heated while being stirred until complete dissolution of the greater part of the potassium hydroxide. After partial cooling, 3.5 g. of 1-(2-acetoxy-phenyl)-2-bromo-2-(4-pyridyl)-ethylene hydrochloride (prepared in the foregoing manner) were added and the mixture heated to boiling point for one hour. The color of the reaction mixture passed from yellow to orange, and then returned to yellow while a white precipitate of salts formed. After cooling, the reaction mixture was diluted with 100 ml. of water. The salt precipitate dissolved and a slightly flaky crystalline precipitate appeared. The reaction product was filtered, washed with water and dried under vacuum. In this manner 1.9 g. of 2-(4-pyridyl)-benzofuran were obtained, M.P. 133–134° C. (Yield 97.4%).

By recrystallizing from 40 ml. of heptane, 1.7 g. of pure product were obtained, M.P. 134° C. (yield 87.1%).

EXAMPLE 4

In a one liter, three-necked flask fitted with a reflux condenser, a thermometer and a mechanical stirrer were placed 43.5 g. (0.1 mol) of 1-(2-acetoxy-phenyl)-1:2-dibromo-2-(4-pyridyl)-ethane hydrochloride, 25 g. (0.3 mol) of anhydrous sodium acetate and 200 ml. of glacial acetic acid. The mixture was heated to boiling point for one hour while being thoroughly stirred. After partial cooling, 80–90% of the acetic acid was distilled off under reduced pressure. The distillation residue was then treated in two alternative ways.

Treatment A

The distillation residue was taken up in 100 ml. of isopropyl alcohol, centrifuged, and the salts washed over the filter twice with 25 ml. of isopropyl alcohol (weight of salts: 28.7 g.). The filtrate was replaced in the flask. To the isopropyl alcohol solution of 1-(2-acetoxy-phenyl)-2-bromo-2-(4-pyridyl)-ethylene hydrochloride thus obtained were added, while stirring, 68 g. of potassium hydroxide and the solution heated to boiling point for one hour. After partial cooling, the greater part of the alcohol was distilled off under reduced pressure and the residue taken up in 900 ml. of water, filtered, washed over the filter with water and dried under vacuum at 50° C. In this manner, 18.5 g. of 2-(4-pyridyl)-benzofuran, M.P. 133° C., were obtained. The product was purified by crystallization from 300 ml. of heptane, after treatment with active charcoal. The product so obtained was filtered, washed with petroleum ether (B.P. 40–60° C.) and dried under vacuum at 40–50° C. 15.2 g. of 2-(4-pyridyl)-benzofuran were obtained, M.P. 134° C. (yield 78%).

Treatment B

Instead of taking up the distillation residue in isopropyl alcohol as in Treatment A, it was taken up in 250 ml. of water. The solution was heated to 75° C. while stirring, after which a cold solution consisting of 68 g. of potassium hydroxide (85%) in 68 ml. of water was rapidly added. The temperature rose to about 90–95° C. and the oily emulsion of the monobrominated base immediately disappeared (saponification and formation of orange colored potassium phenolate). Heating was continued to the boiling point (about 105° C.). At this temperature, cyclodehydro-halogenation occured, a precipitate of 2-(4-pyridyl)-benzofuran formed and the reaction medium became partially discolored. The precipitate was cooled, filtered, washed with water and dried under vacuum at 50° C. to give 19.2 g. of the desired product, M.P. 133° C. Recrystallization was effected in the same manner as in Treatment A to give 15.8 g. of 2-(4-pyridyl)-benzofuran, M.P. 134° C. (yield 81%).

EXAMPLE 5

In a 250 ml. three-necked flask, equipped with a reflux condenser, a thermometer, a dropping funnel and a mechanical stirrer, was placed a solution consisting of 11.15 g. (0.05 mol) of 1-(2-acetoxy-phenyl)-2-(4-pyridyl)-ethylene in 50 ml. of glacial acetic acid. While stirring vigorously and cooling in a water bath, a solution of 8 g. of bromine in 5 ml. of acetic acid was introduced drop by drop into the solution first prepared. An orange-yellow precipitate was formed, which was the dibromide. When all the bromine had been introduced, the reaction product was slowly heated. The dibromide precipitate dissolved at about 60° C. to 70° C. and at 80° C. a new crystalline precipitate formed. Heating was continued to 105° C. and the reaction medium maintained at this temperature for half an hour. After cooling, the crystals were filtered, then washed with ether and finally dried.

In this manner, a first fraction of 6.5 g. of 1-(2-acetoxy-phenyl) - 2 - bromo-2-(4-pyridyl)-ethylene hydrobromide was obtained with a M.P. of 200° C. (decomp.) which was recrystallized from an ethanol/water mixture to give 4 g. of straw-colored crystals with a M.P. of 210° C. (decomp.).

The acetic mother-liquor of the first filtration was treated with sulphuric ether, which gave 8.2 g. of a flocculent precipitate which was filtered, washed with ether and dried (M.P. 198° C. with decomp.). This precipitate was purified by dissolution in ethanol followed by fractional precipitation by addition of sulphuric ether. In this way 5.1 g. of hydrobromide were obtained with a M.P. of 206° C. (decomp.). Thus, the total weight of hydrobromide obtained was 9.1 g., equivalent to a yield of 53.5%.

The 1-(2-acetoxy-phenyl)-2-bromo-2-(4-pyridyl)-ethylene hydrobromide was then reacted with potassium hydroxide in isopropyl alcohol in the manner described in Example 3 to form 2-(4-pyridyl)-benzofuran.

EXAMPLE 6

A solution of 1-(2-acetoxy-phenyl)-2-(4-pyridyl)-ethylene, obtained by condensing 46.5 g. (0.5 mol.) of γ-picoline and 61 g. (0.5 mol.) of salicylaldehyde in the manner described in Example 2, was evaporated and the residue taken up in 800 ml. of acetic acid. To this solution was added, drop by drop, a solution of 65 g. (0.4 mol of bromine dissolved in 160 ml. of acetic acid, the temperature of the reaction mixture being maintained between 25 and 35° C. When all the bromine solution had been added, the solution was heated to 85° C. and maintained at this temperature for 20 minutes.

Under reduced pressure, 900 ml. of acetic acid were distilled. The distillation residue was taken up in 500 ml. of water. The solution was heated to 75° C. and a solution of 224 g. (4 mol) of potassium hydroxide in 224 ml. of water rapidly added. This solution was heated for one hour to boiling point and then cooled while being stirred. The precipitate which formed was filtered, washed with water and dried under vacuum. 15.6 g. of 2-(4-pyridyl)-benzofuran were obtained, M.P. 134° C., representing a yield of 16%. After recrystallization from heptane, there were obtained 11.2 g. of the pure product, M.P. 134° C. (yield 11.4%).

EXAMPLE 7

In order to prepare the hydrochloride of 2-(4-pyridyl)-benzofuran, 19.5 g. (0.1 mol) of 2-(4-pyridyl)-benzofuran were dissolved in 250 ml. of tetrahydrofuran and, into the solution so formed, was introduced gaseous HCl, while stirring vigorously, until the hydrochloride of 2-(4-pyridyl)-benzofuran had completely precipitated. The solution was filtered and the precipitate washed with tetrahydrofuran, and dried under vacuum at a temperature of about 50° C. in a drying-oven. The yield in crude hydrochloride was 23 g. The hydrochloride was the recrystallized in absolute ethanol (or in isopropanol). The crystals so obtained were dried under vacuum in a drying-oven at 50° C. The yield in pure hydrochloride was 21.9 g., i.e. 95% M.P. 240° C. (Buchi apparatus).

By using the same process the following salts were obtained:

5-chloro-2-(4-pyridyl)-benzofuran hydrochloride, M.P. 230° C. (decomposition), (absolute ethanol)
5-chloro-2-(3-pyridyl)-benzofuran hydrochloride, M.P. 191° C. (decomposition) (isopropanol or absolute ethanol)
5-piperidinomethyl-2-(4-pyridyl)-benzofuran dioxalate, M.P. 203° C. (absolute ethanol)
2-(6-methyl-2-pyridyl)-benzofuran hydrochloride, M.P. 135° C. (decomposition), (absolute ethanol)

EXAMPLE 8

Tablets were prepared by granulating and compressing the following ingredients in accordance with known pharmaceutical techniques:

|  | Mg. per tablet |
|---|---|
| 2-(4-pyridyl)-benzofuran | 25 |
| Lactose | 100 |
| Corn starch | 35 |
| Gelatin | 3 |
| Alginic acid | 5 |
| Talc | 10 |
| Magnesium stearate | 2 |
| Mg. | 180 |

EXAMPLE 9

Tablets were prepared by granulating and compressing the following ingredients in accordance with known pharmaceutical techniques:

|  | Mg. per tablet |
|---|---|
| 2-(4-pyridyl)-benzofuran | 50 |
| Lactose | 214 |
| Corn starch | 60 |
| Gelatin | 6 |
| Alginic acid | 7 |
| Talc | 10 |
| Stearic acid | 3 |
| Mg. | 350 |

What is claimed is:
1. A compound of the class consisting of a free base and the pharmaceutically acceptable acid addition salts thereof, the free base being represented by the formula:

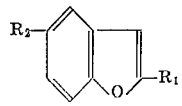

wherein $R_1$ is selected from the group consisting of 2-pyridyl, 3-pyridyl, 4-pyridyl, 6-methyl-2-pyridyl, 5-methyl-2-pyridyl and 5-methyl-4-pyridyl and $R_2$ is selected from the group consisting of hydrogen, chlorine, methyl and piperidino-methyl.

2. 2-(4-pyridyl)-benzofuran.

3. A pharmaceutically acceptable acid addition salt of 2-(4-pyridyl)-benzofuran.

4. A method of producing a benzofuran derivative represented by the formula:

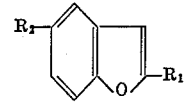

wherein $R_1$ is selected from the group consisting of 2-pyridyl, 3-pyridyl, 4-pyridyl, 6-methyl-2-pyridyl, 5-methyl-2-pyridyl and 5-methyl-4-pyridyl and $R_2$ is selected from the group consisting of hydrogen, chlorine, methyl and piperidino-methyl, said method comprising heating an alkali-metal derivative of a compound of the general formula:

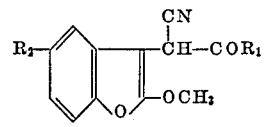

wherein $R_1$ and $R_2$ have the meanings given above, with concentrated hydrobromic acid.

5. A method of producing a benzofuran derivative represented by the formula:

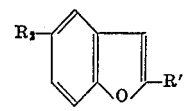

wherein $R'$ is selected from the group consisting of 2-pyridyl, 4-pyridyl, 6-methyl-2-pyridyl, 5-methyl-2-pyridyl and 5-methyl-4-pyridyl and $R_2$ is selected from the group consisting of hydrogen, chlorine, methyl and piperidino-methyl, said method comprising reacting a compound of the formula:

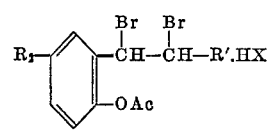

wherein $R'$ and $R_2$ have the meanings given above, X is selected from the group consisting of chlorine and bromine and Ac is acetyl, with a substance selected from the group consisting of a strong alkaline agent and an alkali-metal alkoxide.

6. A method according to claim 5, in which the starting product is a compound of the formula:

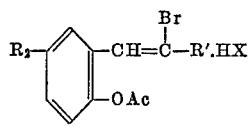

wherein $R'$, $R_2$, X and Ac have the same meanings as in claim 9.

7. A method according to claim 5, wherein the strong alkaline agent is selected from the group consisting of an alkali-metal hydride and an alkali-metal hydroxide.

8. A method according to claim 7, wherein the alkali-metal hydride is sodium hydride, the alkali-metal hydroxide is potassium hydroxide and the alkali-metal alkoxide is selected from the group consisting of the sodium and potassium salts of ethoxide, isopropoxide and tert.butoxide.

9. A method according to claim 5, wherein the free base so obtained is reacted with an acid to form a pharmaceutically acceptable acid addition salt.

10. A method according to claim 4, wherein the free base so obtained is reacted with an acid to form a pharmaceutically acceptable acid addition salt.

References Cited

UNITED STATES PATENTS 2,633,468   3/1953   Pohland _____ 260—294.7

HENRY R. JILES, Primary Examiner
A. L. ROTMAN, Assistant Examiner

U.S. Cl. X.R.

260—240, 294, 294.7, 294.9, 295, 465; 424—263, 267

UNITED STATES PATENT OFFICE
CERTIFICATE OF CORRECTION

Patent No. 3,470,192 September 30, 1969

Fernand Binon et al.

It is certified that error appears in the above identified patent and that said Letters Patent are hereby corrected as shown below:

Column 4, line 57, after "6 mol" insert a closing parenthes Column 5, line 21, "230 g." should read -- 320 g. --. Column 7, line 11, "-(4-pyridyl)-ethyl," should read -- -(4-pyridyl)-ethylene, --. Column 12, line 70, claim reference numeral "9" should read -- 5 --.

Signed and sealed this 27th day of October 1970.

(SEAL)
Attest:

Edward M. Fletcher, Jr.
Attesting Officer

WILLIAM E. SCHUYLER, JR.
Commissioner of Patents